United States Patent [19]
Ho et al.

[11] Patent Number: 6,151,225
[45] Date of Patent: Nov. 21, 2000

[54] SWITCHING MODE POWER SUPPLY

[75] Inventors: Seong Hwan Ho, Siheung; Hong Keun Eui, Seoul, both of Rep. of Korea

[73] Assignee: Samsung Electronics, Co., Ltd., Suwon, Rep. of Korea

[21] Appl. No.: 09/212,087

[22] Filed: Dec. 15, 1998

[30] Foreign Application Priority Data

Dec. 31, 1997 [KR] Rep. of Korea ...................... 97-82094

[51] Int. Cl.[7] .................................................. H02M 3/335
[52] U.S. Cl. .................................. 363/21; 363/20; 363/16
[58] Field of Search ................................ 363/21, 16, 17, 363/20, 18, 19, 131, 132, 97

[56] References Cited

U.S. PATENT DOCUMENTS 5,734,564 3/1998 Brkovic ..................................... 363/21

Primary Examiner—Peter S. Wong
Assistant Examiner—Rajnikant B. Patel
Attorney, Agent, or Firm—Marger Johnson & McCollom, P.C.

[57] ABSTRACT

A switching mode power supply including a transformer, a power transistor, rectifiers, filters, a feedback portion, a power transistor controlling portion, and a synchronous signal controlling portion is provided. The transformer includes an input winding to one end of which an input voltage is applied and a feedback winding, one end of which is grounded, and to which energy is fed back from a secondary winding, in a primary winding, and at least one secondary winding. The power transistor has a first electrode and a second electrode connected between the other end of the input winding and a ground. The rectifiers rectify the voltage generated by the secondary windings to direct current. The filters filter the direct current voltage output from the rectifiers and output it as an output voltage. The feedback portion feeds back some of the output voltage to the power transistor controlling portion. The power transistor controlling portion, the output port of which is connected to the controlling electrode of the power transistor, controls the power transistor in response to a signal output from the feedback portion and a synchronous signal applied from the outside. The synchronous signal controlling portion connected between the other end of the feedback winding and the power transistor controlling portion, to which the synchronous signal is applied, turns on the power transistor right before or right after the power transistor is turned on after the power transistor is turned off, in an initial stage in which the synchronous signal begins to be applied in response to the voltage generated in the feedback winding.

14 Claims, 7 Drawing Sheets

SWITCHING MODE POWER SUPPLY

BACKGROUND OF THE INVENTION

1. Field of the Invention

The present invention relates to a power supply, and more particularly, to a switching mode power supply for supplying direct current power.

2. Description of the Related Art

A power supply for supplying power is used in all systems using electricity. The power supply must provide stable power. If the power supplied by the power supply is unstable, the system that receives the power may not operate properly. Therefore, providing stable power is an essential requirement of the power supply. In a switching mode power supply, switching means is used in order to supply stable power.

FIG. 1 is a circuit diagram of a conventional switching mode power supply. Referring to FIG. 1, the conventional switching mode power supply 101 includes a power source 191, an input controlling portion 111, a transformer 121, first and second diodes 131 and 132, first and second capacitors 141 and 142, first and second snubber circuits 151 and 152, a feedback signal generating portion 161, a feedback signal receiving portion 171, and a power switching integrated circuit 181. The power switching integrated circuit 181 is comprised of a comparator 183, a controlling portion 185, and a power transistor 187. The transformer 121 includes an input winding 123 and a feedback winding 125 in the primary windings and first and second windings 127 and 128 in the secondary.

An input voltage Vi is applied to the input winding 123 of the transformer 121 through the input controlling portion 111. When the power switch is turned on, current flows to the power transistor 187 through the input winding 123. When the power transistor 187 is turned off, voltage is generated in the first and second windings 127 and 128 and the feedback winding 125. Then, the first and second diodes 131 and 132 are turned on. When the first and second diodes 131 and 132 are turned on, the voltage generated in the first and second windings 127 and 128 is rectified through the first and second diodes 131 and 132, filtered by the first and second capacitors 141 and 142, and output as the output voltage Vo of the switching mode power supply 101.

The output voltage Vo is fed back to the feedback signal receiving portion 171 through the feedback signal generating portion 161. The feedback signal generating portion 161 converts the output voltage Vo into an optical signal and transmits it. The feedback signal receiving portion 171 receives the optical signal transmitted by the feedback signal generating portion 161, converts it into an electrical signal, and transmits it to the power switching integrated circuit 181.

The power switching integrated circuit 181 is comprised of a comparator 183, a controlling portion 185, and a power transistor 187. An NMOS transistor is used as the power transistor 187. The signal transmitted from the feedback signal receiving portion 171 is transmitted to the power transistor 187 through the controlling portion 185. When the output voltage Vo is higher than the voltage fed back from the power transistor 187, the power transistor 187 is turned off. When the power transistor 187 is turned off, the output voltage decreases. When the output voltage Vo is lower than the voltage fed back from the power transistor 187, the power transistor 187 is turned on and the output voltage increases.

A reference voltage Vr of 6.2 volts is applied to an inverting (−) input of the comparator 183. A synchronous voltage Vsync, in which a synchronous signal Φ sync input from the outside is added to a controlling voltage Vp output from the controlling portion 185, is applied to a non-inverting input. When the synchronous voltage Vsync is higher than the reference voltage Vr, the power transistor 187 is turned on. On the other hand, when the synchronous voltage Vsync is lower than the reference voltage Vr, the power transistor 187 is turned off. The waveform of the synchronous voltage Vsync is shown in FIG. 2.

FIG. 2 shows waveforms of signals input to and output from the power switching integrated circuit 181 shown in FIG. 1. Referring to FIG. 2, when a feedback winding voltage Ve generated between both ends of the feedback winding 125 is positive, the power transistor 187 is turned off. When the feedback winding voltage Ve is negative, the power transistor 187 is turned on. When the synchronous voltage Vsync is higher than the reference voltage Vr right after the power transistor 187 is turned off, a surge voltage 201 of about 500 volts is generated in the first and second diodes 131 and 132. When the surge voltage 201 is generated, the first and second diodes 131 and 132 may be broken, thus losing their rectification function.

The surge voltage 201 is generated as follows. When the level of the synchronous voltage Vsync exceeds that of the reference voltage Vr, the power transistor 187 is turned on. When the power transistor 187 is then turned off, voltage is generated in the first and second windings 127 and 128. Accordingly, the first and second diodes 131 and 132 become conductive. When the first and second diodes 131 and 132 are conductive, the current generated in the first and second windings 127 and 128 gradually decreases, flowing through the first and second diodes 131 and 132. When the power transistor 187 is turned on and then off before the current flowing through the first and second diodes 131 and 132 decreases enough, voltage is generated in the first and second windings 127 and 128. Accordingly, the surge voltage 201 is generated across the first and second diodes 131 and 132. The surge voltage 201 may severely damage the first and second diodes 131 and 132.

The conventional switching mode power supply 101 uses the first and second snubber circuits 151 and 152 in order to reduce the surge voltage 201. The first and second snubber circuits 151 and 152 are connected respectively to the first and second diodes 131 and 132, in parallel. The first and second snubber circuits 151 and 152 protect the first and second diodes 131 and 132 by absorbing the surge voltage 201 when the surge voltage 201 is generated across the first and second diodes 131 and 132.

The first snubber circuit 151 is constituted of a diode 151a, a capacitor 151b, and a resistor 151c. The first snubber circuit 151 and the second snubber circuit 152 have the same structure. The manufacturing expenses of the switching mode power supply 101 increase due to the first and second snubber circuits 151 and 152. To remove the need for the first and second snubber circuits 151 and 152, the first and second diodes 131 and 132 can be replaced by diodes having a short reverse recovery time. However, diodes having a short reverse recovery time are expensive, so this option is actually no cheaper If the generation of the surge voltage can be prevented, the first and second snubber circuits 151 and 152 and the diodes having a short reverse recovery time need not be used.

SUMMARY OF THE INVENTION

To solve the above problem(s), it is an objective of the present invention to provide a switching mode power supply for preventing the generation of a surge voltage.

To achieve the above objective, the switching mode power supply according to the present invention includes a transformer, a power transistor, rectifiers, filters, a feedback portion, a power transistor controlling portion, and a synchronous signal controlling portion.

The transformer comprises an input winding to one end of which an input voltage is applied and a feedback winding, one end of which is grounded, and to which energy is fed back from a secondary winding, in a primary winding, and at least one secondary winding.

The power transistor has a first electrode and a second electrode connected between the other end of the input winding and a ground.

The rectifiers input ports of which are connected to the other ends of the windings, rectify the voltage generated by the secondary windings to direct current.

The filters connected between the outputs of the rectifiers and the ground filter the direct current voltage output from the rectifiers and output it as an output voltage.

The feedback portion connected between the output of either the filters or the power transistor controlling portion, feeds back some of the output voltage to the power transistor controlling portion.

The power transistor controlling portion, the output port of which is connected to the controlling electrode of the power transistor, controls the power transistor in response to a signal output from the feedback portion and a synchronous signal applied from the outside.

The synchronous signal controlling portion connected between the other end of the feedback winding and the power transistor controlling portion, to which the synchronous signal is applied turns on the power transistor right before or right after the power transistor is turned on after the power transistor is turned off, in an initial stage in which the synchronous signal begins to be applied in response to the voltage generated in the feedback winding.

According to the present invention, the output voltage is stable and the switching mode power supply is cheaper.

BRIEF DESCRIPTION OF THE DRAWING(S)

The above objective(s) and advantage(s) of the present invention will become more apparent by describing in detail a preferred embodiment thereof with reference to the attached drawing(s) in which.

DESCRIPTION OF THE PREFERRED EMBODIMENT(S)

Hereinafter, an embodiment according to the present invention will be described in detail with reference to the attached drawings.

Figure 1:
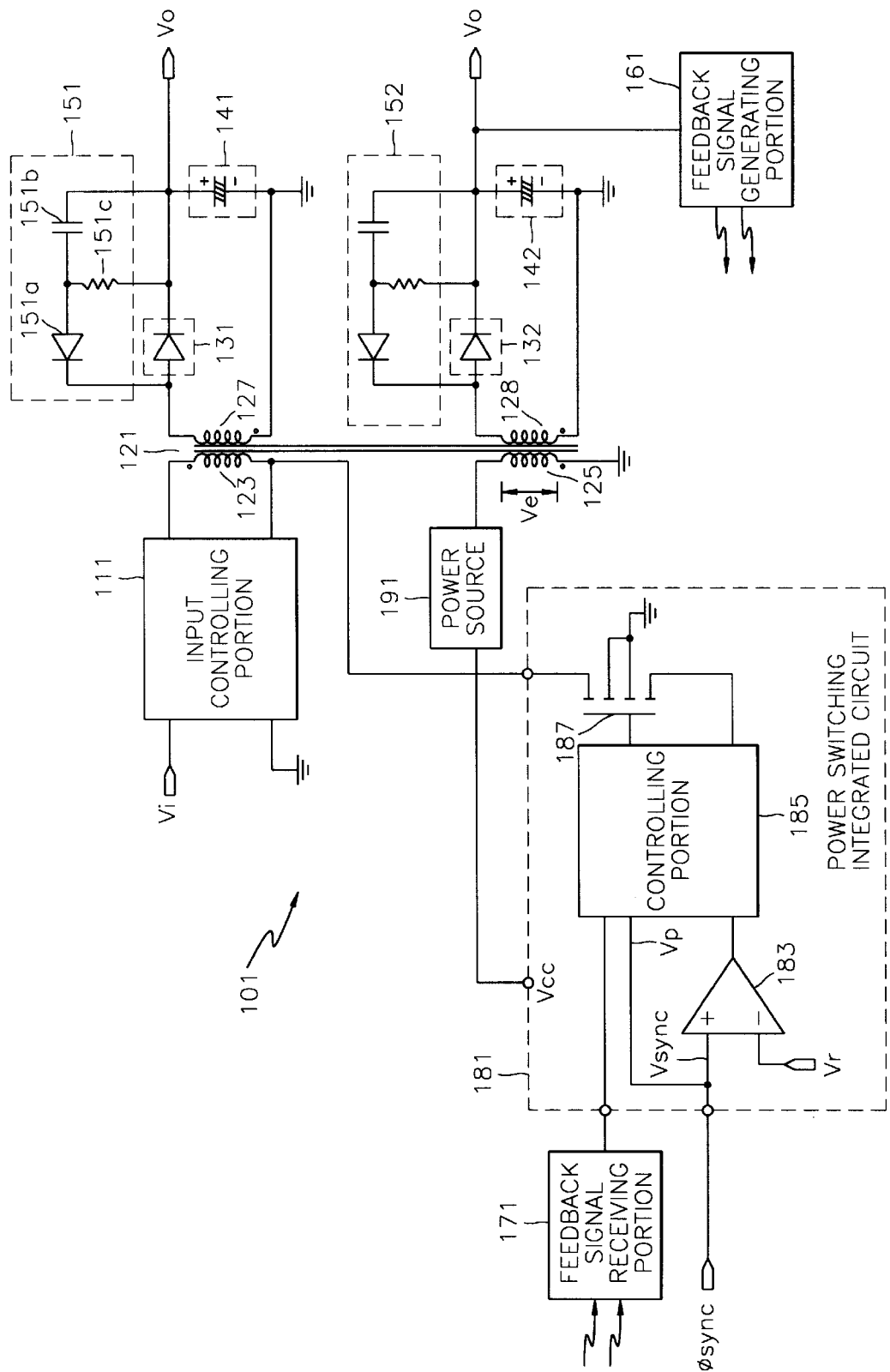
FIG. 1 is a circuit diagram of a conventional switching mode power supply.
Figure 2:
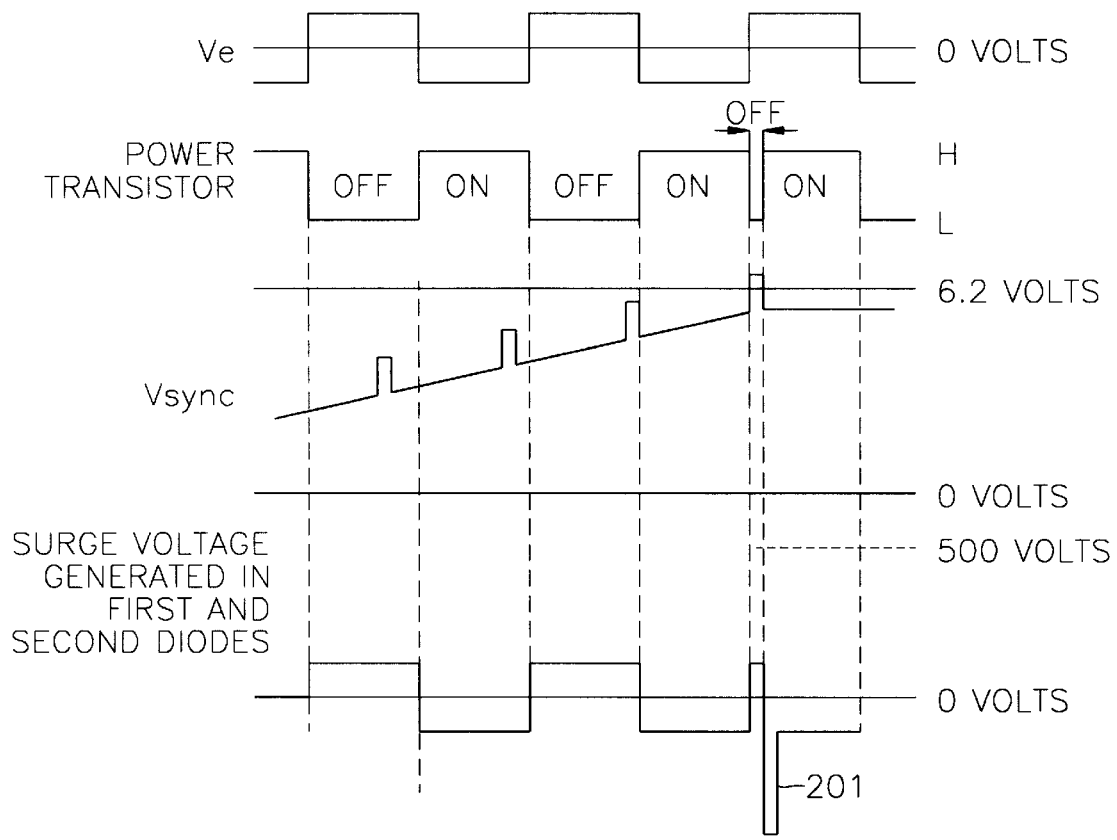
FIG. 2 shows waveforms of signals input to and output from a power switching integrated circuit shown in FIG. 1.
Figure 3:
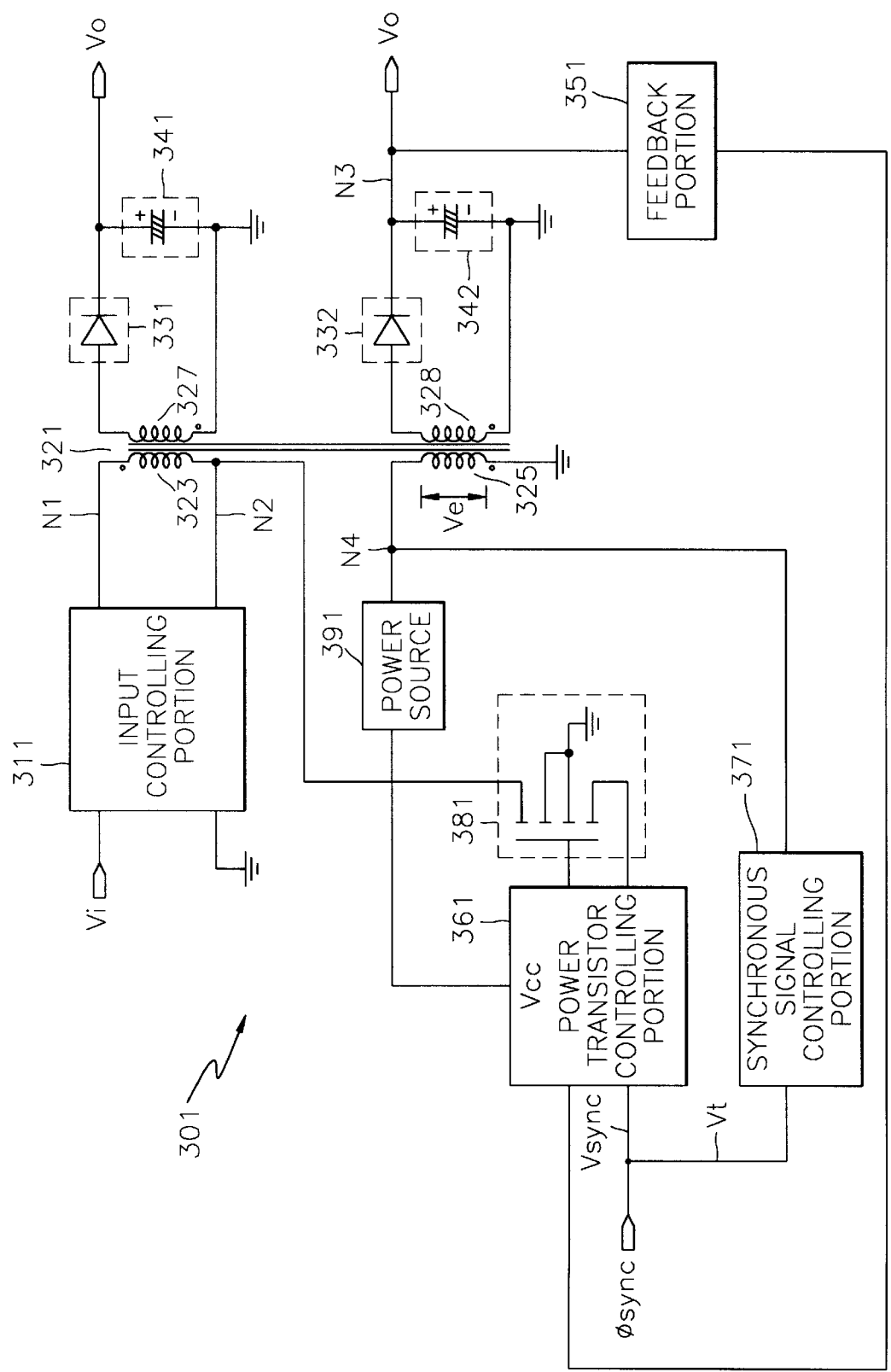
FIG. 3 is a circuit diagram of a switching mode power supply according to the present invention.

FIG. 3 is a circuit diagram of a power supply according to the present invention. Referring to FIG. 3, a switching mode power supply 301 according to the present invention includes a transformer 321, an input controlling portion 311, a power transistor 381, first and second rectifiers 331 and 332, first and second filters 341 and 342, a feedback portion 351, a power transistor controlling portion 361, a power source 391, and a synchronous signal controlling portion 371.

The primary windings of the transformer 321 include an input winding 323, to one end of which an input voltage Vi is applied, and a feedback winding 325 to which energy is fed back from secondary windings. The secondary windings of the transformer 321 include first and second windings 327 and 328 one end of each of which is grounded. In the transformer 321, the energy is accumulated in a flyback method in the input winding 323 when the power transistor 381 is turned on, and the energy accumulated in the input winding 323 is transmitted to the first winding 327, the second winding 328, and the feedback winding 325 when the power transistor 381 is turned off.

In the power transistor 381, a first electrode, i.e., a drain, and a second electrode, i.e., a source, are connected between the other end of the input winding 323 and the ground (GND). The controlling electrode of the power transistor 381, i.e., a gate, is connected to the output of the power transistor controlling portion 361. The power transistor 381 is turned on when the voltage of the signal generated by the power transistor controlling portion 361 is high. The power transistor 381 is turned off when the voltage of the signal generated by the output of the power transistor controlling portion 361 is low.

The input voltage Vi is applied to the input of the input controlling portion 311, and the output port thereof is connected to the input winding 323 of the transformer 321. The input controlling portion 311 protects the power transistor 381 by absorbing the surge voltage generated in the input winding 323 of the transformer 321.

The first rectifier 331 is comprised of a diode having an anode connected to the non-grounded end of the first winding 327 of the transformer 321 and a cathode connected to the positive terminal of the first filter 341. The first rectifier 331 rectifies the alternating current output from the first winding 327 of the transformer 321 to a direct current, and applies it to the first filter 341.

The first filter 341 is comprised of an electrolytic capacitor having a positive terminal (+) connected to the output of the first rectifier 331 and a negative terminal (−) connected to the ground GND. The first filter 341 filters the direct current voltage rectified by the first rectifier 331. The filtered direct current voltage is output as the output voltage Vo of the switching mode power supply 301.

The second rectifier 332 is comprised of a diode having an anode connected to the non-grounded end of the second winding 328 of the transformer 321 and a cathode connected to the positive terminal of the second filter 342. The second rectifier 332 rectifies the alternating current output from the second winding 328 of the transformer 321 to a direct current and applies it to the second filter 342.

The second filter 342 is comprised of a capacitor having a positive terminal (+) connected to the output of the second rectifier 332 and a negative terminal (−) connected to the ground GND. The second filter 342 filters the direct current voltage output from the second rectifier 332. The filtered direct current voltage is output as the output voltage Vo of the switching mode power supply 301.

The feedback portion 351 is connected between the output of the second filter 342 and the power transistor controlling portion 361. The feedback portion 351 feeds back the output voltage Vo to the power transistor controlling portion 361.

The inputs of the power transistor controlling portion 361 are connected to the output of the feedback portion 351 and the output of the synchronous signal controlling portion 371. An output is connected to the controlling electrode of the power transistor 381. The power transistor controlling portion 361 controls the power transistor 381 in response to a signal output from the feedback portion 351, a synchronous signal Φ sync applied from the outside, and a synchronous controlling voltage Vt applied from the synchronous signal controlling portion 371. A synchronous voltage Vsync is generated by adding the synchronous signal Φ sync to the synchronous controlling voltage Vt.

The synchronous signal controlling portion 371 is connected between the non-grounded end of the feedback winding 325 and the power transistor controlling portion 361. The synchronous signal controlling portion 371 turns on the power transistor 381 right before or after the power transistor 381 is turned on after the power transistor 381 is turned off, in an initial stage in which the synchronous signal sync begins to be applied in response to the feedback winding voltage Ve generated by the feedback winding 325.

The power source 391 is connected between the feedback winding 325 and the power supply terminal of the power transistor controlling portion 361. The power source 391 supplies a supply voltage Vcc to the power transistor controlling portion 361 in response to the feedback winding voltage Ve.

Figure 4:
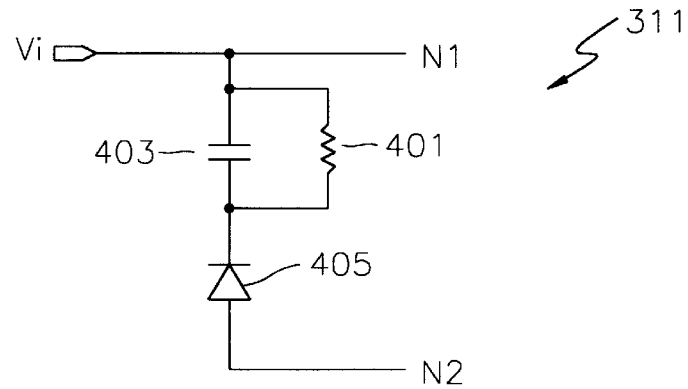
FIG. 4 is a circuit diagram of an input controlling portion shown in FIG. 3.

FIG. 4 is a circuit diagram of an input controlling portion 311 shown in FIG. 3. Referring to FIG. 4, the input controlling portion 311 is comprised of a resistor 401, a capacitor 403, and a diode 405. One end of the resistor 401 and one end of the capacitor 403 are connected to one end N1 of the input winding 323. In the diode 405, the cathode is connected in common to the other ends of the resistor 401 and the capacitor 403, and the anode is connected to the other end N2 of the input winding 323. The input voltage Vi is applied to one end of the resistor 401 and the capacitor 403. The input controlling portion 311 is a snubber circuit. The input controlling portion 311 protects the power transistor 381 by absorbing the surge voltage generated by the input winding 323 of the transformer 321.

Figure 5:
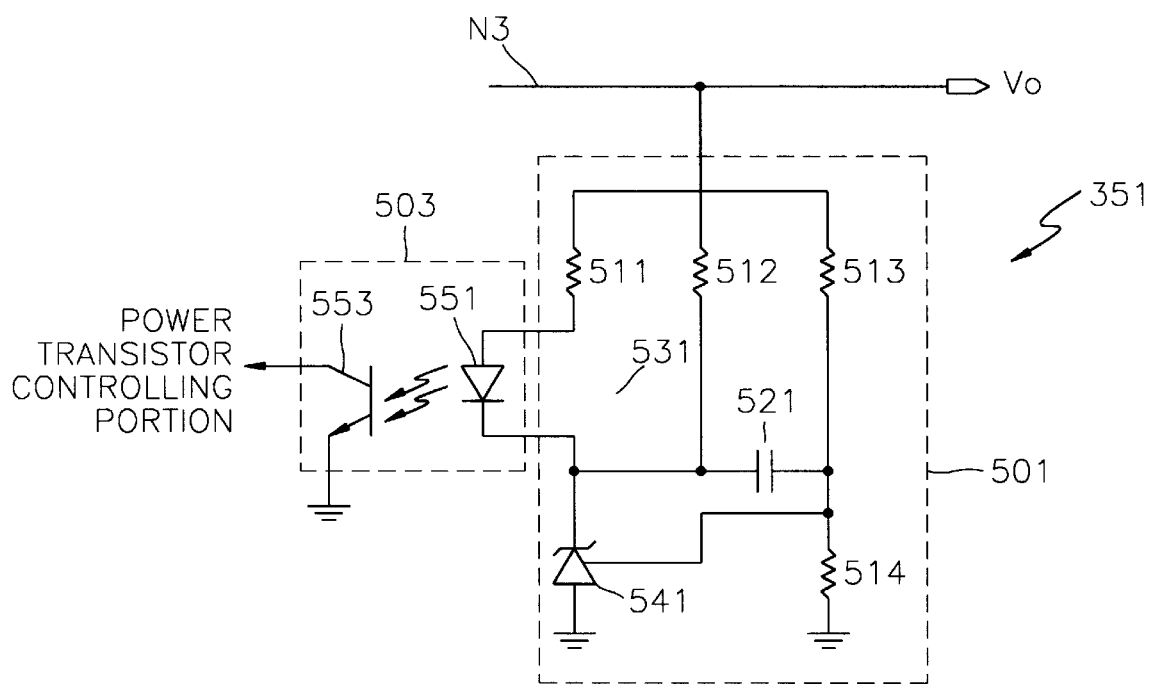
FIG. 5 is a circuit diagram of a feedback portion shown in FIG. 3.

FIG. 5 is a circuit diagram of a feedback portion 351 shown in FIG. 3. Referring to FIG. 5, the feedback portion 351 includes a feedback controlling portion 501 and an opto coupler 503.

The opto coupler 503 is connected to the output port of the feedback controlling portion 501. The opto coupler 503 is constituted of a photo diode 551 for converting an electrical signal into an optical signal and a photo transistor 553 for converting an optical signal into an electrical signal. The electrical signal generated from the photo transistor 553 is transmitted to the power transistor controlling portion 361.

The feedback controlling portion 501 transmits some of the output voltage Vo to the opto coupler 503 without loss.

The feedback controlling portion 501 includes first through fourth resistors 511, 512, 513, and 514, a capacitor 521, and a precision voltage reference 541. The capacitor 521 improves the load regulation of the output voltage Vo by increasing the low frequency loop gain enough. The resistor 512 for supplying bias to the precision voltage reference 541 can make the current flowing through the photo diode 551 almost zero.

Figure 6:
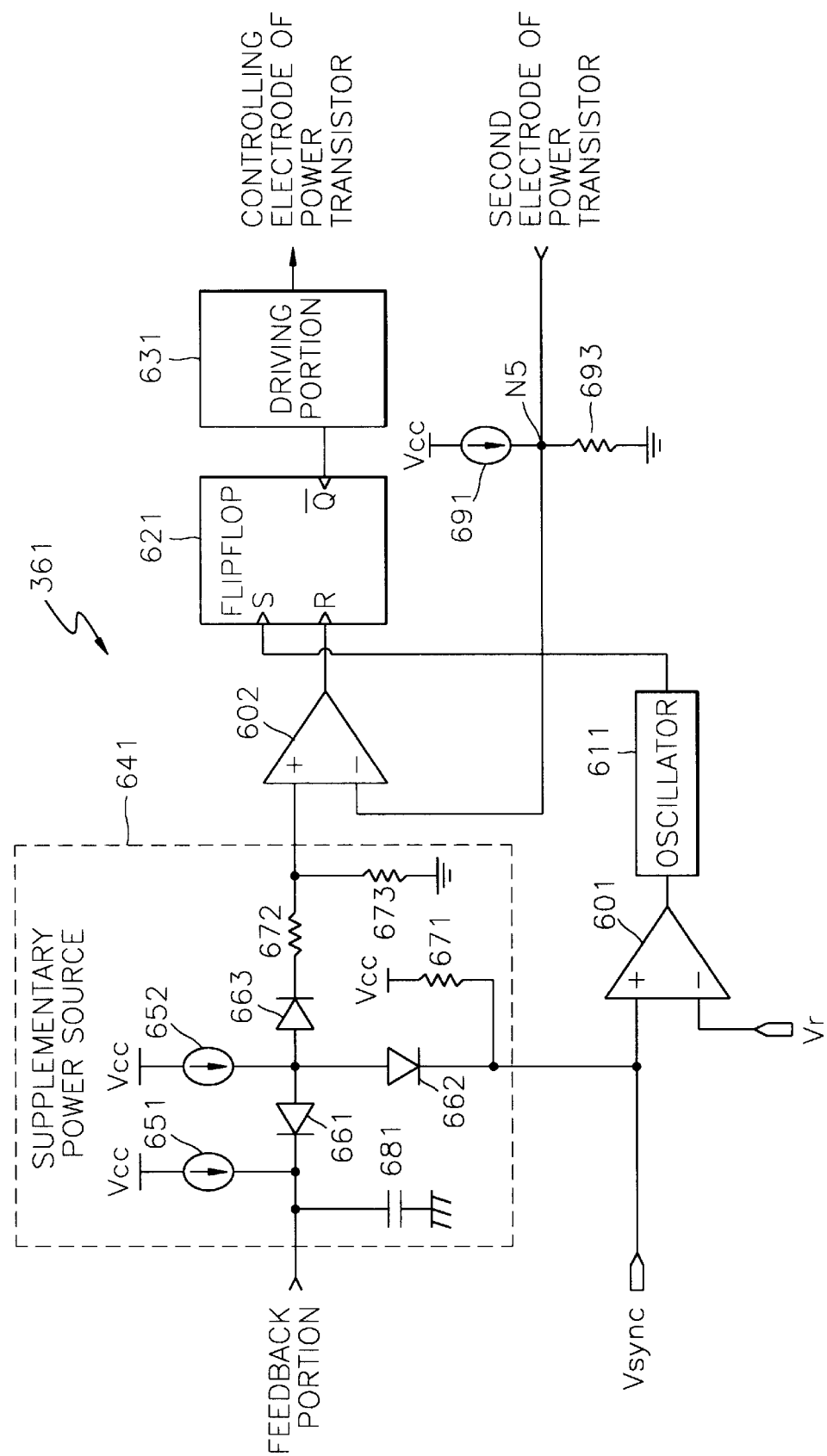
FIG. 6 is a block diagram of a power transistor controlling portion shown in FIG. 3.

FIG. 6 is a block diagram of a power transistor controlling portion 361 shown in FIG. 3. Referring to FIG. 6, the power transistor controlling portion 361 includes first and second comparators 601 and 602, an oscillator 611, a supplementary power source 641, a flipflop 621, and a driving portion 631.

In the supplementary power source 641, an input is connected to the feedback portion 351 and an output is connected to the first and second comparators 601 and 602. The supplementary power source 641 supplies a predetermined voltage, for example, 5 volts, to the first comparator 601 and controls the second comparator 602 in response to the output signal of the feedback portion 351. The supplementary power source 641 is comprised of first and second current sources 651 and 652, first through third diodes 661, 662, and 663, first through third resistors 671, 672, and 673, and a capacitor 681.

One end of the capacitor 681 is connected to the ground GND. The other end of the capacitor 681 is connected to the output of the first current source 651. The capacitor 681 filters noise included in the output signal of the feedback portion 351.

The cathode of the first diode 661 is connected to the output of the first current source 651. The anode of the first diode 661 is connected to the output of the second current source 652. When the voltage applied to the anode of the first diode 661 is higher than the voltage obtained by adding the voltage drop of the first diode 661 to the voltage applied to the cathode of the first diode 661, the first diode 661 is turned on. Accordingly, current flows from the anode of the first diode 661 to the cathode of the first diode 661.

The anode and cathode of the second diode 652 are respectively connected between the output of the second current source 652 and the non-inverting input (+) of the first comparator 601. One end of the first resistor 671 is connected to the cathode of the second diode 652. A supply voltage Vcc is applied to the other end of the first resistor 671. A predetermined voltage is applied to the non-inverting input (+) of the first comparator 601 through the first resistor 671.

The anode of the third diode 663 is connected to the output of the second current source 652. One end of the second resistor 672 is connected to the cathode of the third diode 663. The third resistor 673 is connected between the other end of the second resistor 672 and the ground GND. The other end of the second resistor 672 is connected to the non-inverting input (+) of the second comparator 602. When the voltage applied to the anode of the first diode 661 is lower than the voltage obtained by adding the voltage drop of the first diode 661 to the voltage applied to the cathode of the first diode 661, the third diode 663 is turned on. Accordingly, the voltage is applied to the second resistor 672 and the third resistor 673. The voltage is divided by the second resistor 672 and the third resistor 673, and applied to the non-inverting input (+) of the second comparator 602.

The synchronous voltage Vsync and the voltage generated by the supplementary power source 641 are applied to the non-inverting input (+) of the first comparator 601. A predetermined reference voltage Vr, for example, 6.2 v, is applied to the inverting input (−) of the first comparator 601. The first comparator 601 compares the voltage applied to the non-inverting input (+) with the voltage applied to the inverting input (−) and generates an output signal according to the result. Namely, when the voltage applied to the non-inverting input (+) of the first comparator 601 is higher than the voltage applied to the inverting input (−) of the first comparator 601, the first comparator 601 generates a signal of a high level. When the voltage applied to the non-inverting input (+) of the first comparator 601 is lower than the voltage applied to the inverting input (−) of the first comparator 601, the first comparator 601 generates a signal of a low level.

The input of the oscillator 611 is connected to the output of the first comparator 601. The oscillator 611 oscillates at a basic frequency, i.e., 20 kHz, when the synchronous voltage Vsync is not applied. When the signal output from the first comparator 611 has a high level, the voltage of the output of the oscillator 611 increases, thus setting the flipflop 621.

The output signal of the supplementary power source 641 is applied to the non-inverting input (+) of the second comparator 602. A predetermined voltage is applied to the inverting input (−) of the second comparator 602. A third current source 691 and a fourth resistor 693 are used in order to apply a predetermined voltage to the inverting input (−) of the second comparator 602. The supply voltage Vcc is applied to the input of the third current source 691. The fourth resistor 693 is connected between the output of the third current source 691 and the ground GND. The second electrode of the power transistor 381 is connected to a node N5 to which the fourth resistor 693 and the third current source 691 are connected. The current output from the third current source 691 and the current fed back from the power transistor 381 flow in the fourth resistor 693. The voltage generated in the fourth resistor 693 is applied to the inverting input (−) of the second comparator 602. The second comparator 602 compares the voltage applied to the non-inverting input (+) with the voltage applied to the inverting input (−) and generates an output signal according to the result. Namely, when the voltage applied to the non-inverting input (+) of the second comparator is higher than the voltage applied to the inverting input (−) of the second comparator 602, the second comparator 602 generates a signal of a high level. When the voltage applied to the non-inverting input (+) is lower than the voltage applied to the inverting input (−), the second comparator 602 generates a signal of a low level. In other words, when the output voltage Vo is higher than the voltage fed back from the power transistor 381, the second comparator 602 outputs a signal of a high level. When the output voltage Vo is lower than the voltage fed back from the power transistor 381, the second comparator 602 outputs a signal of a low level.

The set terminal (S) of the flipflop 621 is connected to the output of the oscillator 611. The reset terminal (R) of the flipflop 621 is connected to the output of the second comparator 602. The flipflop 621 is an RS flipflop. The output of the RS flipflop is shown in Table 1.

TABLE 1

| Input | | Output |
| --- | --- | --- |
| Reset (R) | Set (S) | Q |
| 0 | 0 | Maintain a previous state |
| 0 | 1 | 1 |
| 1 | 0 | 0 |
| 1 | 1 | 0 |

As shown in the Table 1, when the voltages of the signals input to the set terminal (S) and the reset terminal (R) of the RS flipflop are respectively logic high and logic low, a signal at an output terminal (Q) is activated to logic high. When the voltages of the signals input to the set terminal (S) and the reset terminal (R) are respectively logic low and logic high, the signal at the output terminal (Q) is deactivated to logic low. When the voltages of the signals input to the set terminal (S) and the reset terminal (R) of the RS flipflop are both logic low, the signal at the output terminal (Q) maintains a previous state. When the voltages of the signals input to the set terminal (S) and the reset terminal (R) are both logic high, the voltage of the output terminal (Q) becomes logic low. The inversion of the signal output by the output terminal (Q) is output by the output terminal (Q) of the RS flipflop. Namely, when the signal at the output terminal (Q) is logic low, the signal at the output terminal (Q) is logic high.

When the output of the oscillator 611 has a high level, the flipflop 621 is set and the output terminal (Q) outputs a signal of a low level. When the output of the second comparator 602 has a high level, the flipflop 621 maintains a previous state. When the output of the oscillator 61 1 and that of the second comparator 602 have a high level, the output of the flipflop 621 has a high level.

In the driving portion 631, the input is connected to the output of the flipflop 621 and the output is connected to the controlling electrode of the power transistor 381. The driving portion 631 largely turns on the power transistor 381 by amplifying the output signal of the flipflop 621 when it is weak and applying it to the controlling electrode of the power transistor 381.

The power transistor controlling portion 361 and the power transistor 381 can be realized in one integrated circuit, such as the KA2S0680 and KA2S0880 manufactured by Samsung electronics Co. Ltd.

Figure 7:
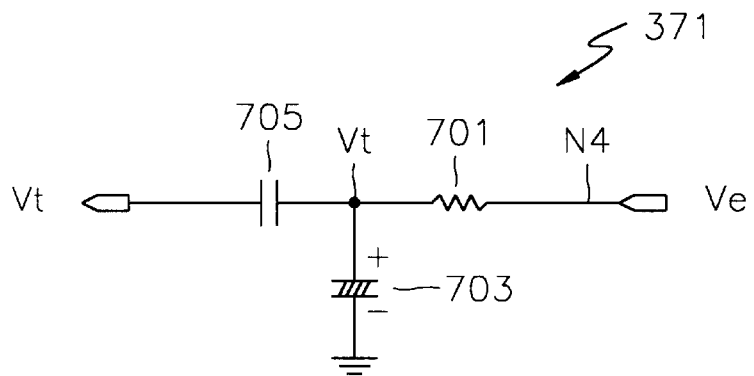
FIG. 7 is a circuit diagram of a synchronous signal controlling portion shown in FIG. 3.

FIG. 7 is a circuit diagram of a synchronous signal controlling portion 371 shown in FIG. 3. Referring to FIG. 7, the synchronous signal controlling portion 371 includes a resistor 701 and first and second capacitors 703 and 705. One end of the resistor 701 is connected to the non-grounded end of the feedback winding 325. The positive terminal (+) and the negative terminal (−) of a first capacitor 703 (such as an electrolytic capacitor) are connected between the other end of the resistor 701 and the ground GND. The synchronous controlling voltage Vt is generated across the first capacitor 703. One end of the second capacitor 705 is connected to the other end of the resistor 701. The other end of the second capacitor 705 is connected to the power transistor controlling portion 361. The second capacitor 705 is a high pass filter, which blocks a direct current element included in the synchronous voltage Vt and passes only an alternating current element. The synchronous controlling voltage Vt is applied to the power transistor controlling portion 361 with the synchronous signal φsync.

The feedback winding voltage Ve charges the first capacitor 703 through the resistor 701. The synchronous controlling voltage Vt is generated at the point where the resistor 701 is connected to the first and second capacitors 703 and 705. The synchronous controlling voltage Vt is obtained by the following equation 1.

$$Vt = Ve + (Vo - Ve)e^{\frac{t}{RC}} \qquad \text{[Equation 1]}$$

wherein Vo is an initial voltage of the synchronous controlling voltage Vt.

As shown in the equation 1, the synchronous controlling voltage Vt is determined by the time constant of the resistor 701 and the first capacitor 703. Therefore, it is possible to control the slope of the synchronous controlling voltage Vt by controlling the time constant of the resistor 701 and the first capacitor 703.

Figure 8A:
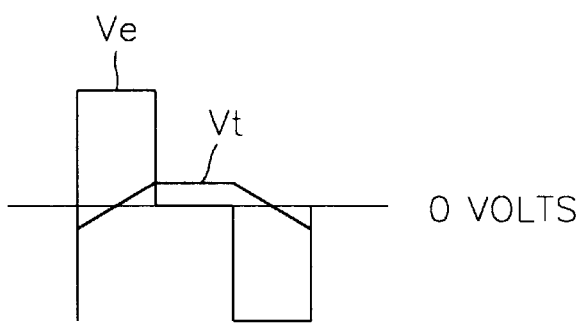
FIGS. 8a and 8b show waveforms of voltages in a discontinuous mode and a continuous mode of the current flowing in the synchronous signal controlling portion shown in FIG. 7.
Figure 8B:
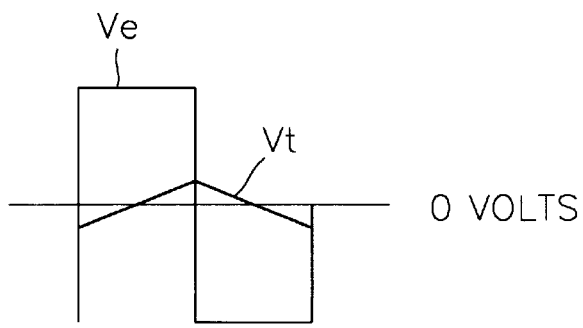

FIGS. 8a and 8b show waveforms of voltages in a discontinuous mode and a continuous mode of the current which flows in the synchronous signal controlling portion 371 shown in FIG. 7. Referring to FIG. 8a, when the synchronous controlling voltage Vt gradually increases when the feedback winding voltage Ve is positive and the synchronous controlling voltage Vt maintains a maximum value when the feedback winding voltage (Ve) is zero, in a discontinuous mode, the synchronous controlling voltage Vt gradually decreases when the feed back winding voltage (Ve) is negative.

Referring to FIG. 8b, in the continuous mode, the synchronous controlling voltage Vt gradually increases when the feedback winding voltage Ve is positive, and gradually decreases when the feedback winding voltage Ve is negative.

The synchronous signal Φ sync is applied to the non-inverting input (+) of the first comparator 601 of the power transistor controlling portion 361, combined with the synchronous controlling voltage V(t). Since a voltage of 5 volts is applied from the supplementary power source 641 to the non-inverting input (+) of the first comparator 601, the synchronous signal Φ sync with V(t) is added to 5 volts and applied to the non-inverting input (+) of the first comparator 601. The second capacitor 705 of the synchronous signal controlling portion 371 filters the direct current element included in the synchronous controlling voltage Vt. Namely, the second capacitor 705 removes the subharmonic included in the synchronous controlling voltage Vt.

Figure 9:
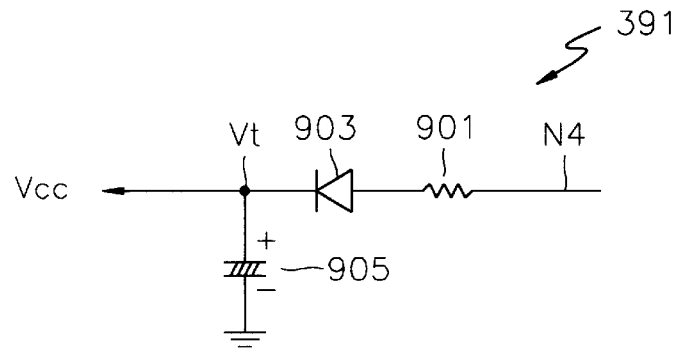
FIG. 9 is a circuit diagram of a power source shown in FIG. 3.

FIG. 9 is a circuit diagram of a power source 391 shown in FIG. 3. Referring to FIG. 9, the power source 391 includes a resistor 901, a diode 903, and a capacitor 905. One end of the resistor 901 is connected to the non-grounded end of the feedback winding 325 and transmits the feedback winding voltage Ve to the diode 903. In the diode 903, the anode is connected to the other end of the resistor 901 and the cathode is connected to the power transistor controlling portion 361. The feedback winding voltage (Ve) is rectified to a direct current voltage by the diode 903. The rectified direct current voltage is filtered by the capacitor 905 and is used as the supply voltage (Vcc) of the power transistor controlling portion 361. The capacitor 905 is an electrolytic capacitor having a positive terminal (+) connected to the cathode of the diode 903 and a negative terminal (−) connected to the ground (GND).

Figure 10:
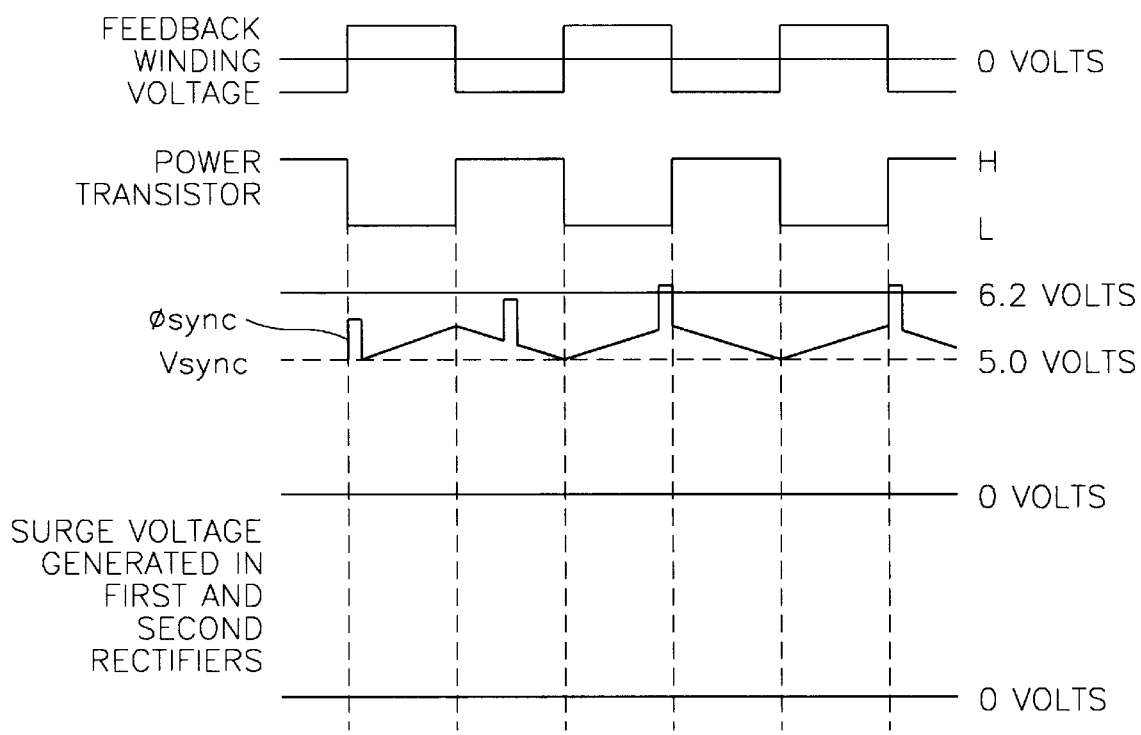
FIG. 10 shows waveforms of signals input to and output from the power transistor and the power transistor controlling portion shown in FIG. 3.

FIG. 10 shows waveforms of signals input to and output from the power transistor 381 and the power transistor controlling portion 361 shown in FIG. 3. Referring to FIG. 10, when the feedback winding voltage (Ve) of the transformer 321 is positive in the continuous mode, the power transistor 381 is turned off. When the feedback winding voltage (Ve) of the transformer 321 is negative, the power switch is turned on. The synchronous signal Φ sync reaches 6.2 volts when it is combined with the synchronous controlling voltage Vt when the synchronous controlling voltage Vt is at a peak. The synchronous signal does not reach 6.2 volts when it is combined with the synchronous controlling voltage Vt when the synchronous controlling voltage Vt is not at a peak. The surge voltage is not generated by the synchronous voltage Vsync reaching 6.2 volts right after or right before the power transistor 381 is turned on.

The operation of the switching mode power supply 301 shown in FIG. 3 will be described with reference to FIG. 10.

When the input voltage (Vi) is applied to the input winding 323 in a state in which the power transistor 381 is turned on, energy is accumulated in the transformer 321. When the power transistor 381 is turned off, a voltage is generated in the first and second windings 327 and 328 and the feedback winding 325. The voltage generated in the feedback winding 325 is accumulated in the first capacitor 703 through the resistor 701 of the synchronous signal controlling portion 371. The synchronous controlling voltage Vt has a uniform slope according to the time constant of the resistor 701 of the synchronous signal controlling portion 371 and the first capacitor 703. The synchronous controlling voltage Vt is applied to the non-inverting input (+) of the first comparator 601 of the power transistor controlling portion 361. The synchronous signal Φ sync is applied from the outside to the non-inverting input (+) of the first comparator 601 of the power transistor controlling portion 361. Namely, a signal in which the synchronous signal Φ sync is combined with the synchronous controlling voltage Vt is applied to the non-inverting input (+) of the first comparator 601 of the power transistor controlling portion 361 as shown in FIG. 4. Also, the voltage of 5 volts is applied from the supplementary power source 391 of the power transistor controlling portion 361 to the non-inverting input (+) of the first comparator 601 of the power transistor controlling portion 361. Therefore, a synchronous voltage Vsync in which the voltage of 5 volts, the synchronous controlling voltage Vt, and the synchronous signal Φ sync are added to each other is applied to the non-inverting input (+) of the first comparator 601 of the power transistor controlling portion 361. When the voltage obtained by adding 5 volts to the synchronous controlling voltage Vt is called a controlling voltage Vc, the peak value of the controlling voltage Vc does not exceed 6.2 volt.

When the synchronous signal Φ sync is combined with the controlling voltage Vc when the controlling voltage Vc does not have a peak value, the synchronous voltage Vsync applied to the non-inverting input (+) of the first comparator 601 of the power transistor controlling portion 361 does not reach 6.2 volts. The synchronous voltage Vsync reaches 6.2 volt only when the synchronous signal Φ sync is combined with the controlling voltage Vc when the controlling voltage Vc has a peak value. When the synchronous voltage Vsync reaches 6.2 volt, the first comparator 601 of the power transistor controlling portion 361 outputs a signal of a high level. Accordingly, the flipflop 621 of the power transistor controlling portion 361 is set. When the flipflop 621 of the power transistor controlling portion 361 is set, the power transistor 381 is turned on.

The controlling voltage Vc has a peak value right before or right after the power transistor 381 is turned on. Since the current which flows in the first and second rectifiers 331 and 332 is reduced enough right before or right after the power transistor 381 is turned on, the surge voltage is not generated in the first and second diodes 331 and 332, even though the power transistor 381 is turned on by the synchronous voltage Vsync.

The surge voltage is not generated in the first and second rectifiers 331 and 332 since the synchronous voltage Vt reaches the voltage applied to the inverting input (−) of the power transistor controlling portion 361 right before or right after the power transistor 381 is turned on. Accordingly, the first and second rectifiers 331 and 332 are protected. Conventional snubber circuits are not necessary since the surge voltage is not generated in the first and second rectifiers 331 and 332. The synchronous signal controlling portion 371 has a simple structure. Therefore, the switching mode power supply 301 is cheap to manufacture.

As mentioned above, according to the present invention, the snubber circuits need not be used since the generation of the surge voltage is prevented by using the synchronous signal controlling portion 371. Accordingly, the manufacturing expenses of the switching mode power supply 301 are reduced.

The present invention is not restricted to the above embodiment, and it is clearly understood that many variations are possible within the scope and spirit of the present invention by anyone skilled in the art.

What is claimed is:

1. A switching mode power supply, comprising:
   a transformer comprising an input winding having a first end to which an input voltage is applied, a feedback winding, having a first end which is grounded and to which energy is fed back from a secondary winding, a primary winding, and at least one secondary winding;
   a power transistor having a first electrode and a second electrode connected between the other end of the input winding and a ground;
   at least one rectifier having input ports connected to the other ends of the windings, for rectifying the voltage generated by the secondary windings to direct current;
   filters connected between the outputs of the rectifiers and the ground for filtering the direct current voltage output from the rectifiers and outputting it as an output voltage;
   a feedback portion connected between the output of either the filters or the power transistor controlling portion, for feeding back some of the output voltage to the power transistor controlling portion;
   a power transistor controlling portion, the output port of which is connected to the controlling electrode of the power transistor, for controlling the power transistor in response to a signal output from the feedback portion and a synchronous signal applied from the outside;
   the power transistor controlling portion including a supplementary power source for responding to a signal generated from the feedback portion; a first comparator for comparing the voltage applied to a non-inverting input with the voltage applied to an inverting input, when a predetermined voltage generated by the supplementary power source and a synchronous controlling voltage generated by the synchronous signal controlling portion are applied to the non-inverting input and a predetermined reference voltage is applied to the inverting input, and for generating a signal of a high level when the voltage applied to the non-inverting input is higher than the voltage applied to the inverting input; an oscillator, the input of which is connected to the output of the first comparator, for generating a pulse signal in response to the output of the first comparator; a second comparator for comparing the voltage applied to a non-inverting input with the voltage applied to an inverting input, when the voltage supplied from the supplementary power source is applied to the non-inverting input and the voltage fed back from the power transistor is applied to the inverting input, and for generating a signal of a high level when the voltage applied to the non-inverting input is higher than the voltage applied to the inverting input; and a flipflop, the set terminal of which is connected to the output of the oscillator, the reset terminal of which is connected to the output of the second comparator, and the output of which is connected to the controlling electrode of the power transistor, for turning on the power transistor when the output of the oscillator has a high level and for turning off the power transistor when the output of the second comparator has a high level; and a synchronous signal controlling portion connected between the other end of the feedback winding and the power transistor controlling portion, to which the synchronous signal is applied for turning on the power transistor right before or right after the power transistor is turned on after the power transistor is turned off, in an initial stage in which the synchronous signal begins to be applied in response to the voltage generated in the feedback winding.

2. The switching mode power supply of claim 1, wherein the rectifiers are diodes in which the respective anodes are connected to the other ends of the secondary windings and the respective cathodes are connected to the filters.

3. The switching mode power supply of claim 1, wherein the filters are electrolytic capacitors in which the positive terminals are connected to the outputs of the rectifiers and the negative terminals are connected to the ground.

4. The switching mode power supply of claim 1, wherein the feedback portion comprises:
   a feedback controlling portion having an input port connected to the output port of one of the filters, for improving the characteristic of the output voltage; and
   an opto coupler connected between the feedback controlling portion and the power transistor controlling portion, for receiving an electrical signal from the feedback controlling portion and transmitting it to the power transistor controlling portion.

5. The switching mode power supply of claim 1, wherein the flipflop is an RS flipflop.

6. The switching mode power supply of claim 1, wherein the synchronous signal controlling portion comprises:
   a resistor, one end of which is connected to the other end of the feedback winding and the other end of which is connected to the input of the power transistor controlling portion, to which the synchronous signal is applied; and
   a capacitor connected between the other end of the resistor and the ground.

7. The switching mode power supply of claim 6, wherein the capacitor is an electrolytic capacitor, the positive terminal of which is connected to the other end of the resistor and the negative terminal of which is connected to the ground.

8. The switching mode power supply of claim 1, wherein the power transistor and the power transistor controlling portion are realized in one integrated circuit.

9. The switching mode power supply of claim 1, further comprising a power source connected between the power transistor controlling portion and the other end of the feedback winding, for supplying a supply voltage to the power transistor controlling portion.

10. The switching mode power supply of claim 9, wherein the power source comprises:

a resistor, one end of which is connected to the other end of the feedback winding;

a diode, the anode of which is connected to the other end of the resistor; and an electrolytic capacitor, the anode of which is connected to the cathode of the diode and the cathode of which is connected to the ground.

11. The switching mode power supply of claim 1, wherein the input controlling portion is a snubber circuit.

12. The switching mode power supply of claim 11, wherein the snubber circuit comprises:

a resistor, one end of which is connected to the other end of the feedback winding;

a diode, the anode of which is connected to the other end of the resistor; and an electrolytic capacitor, the anode of which is connected in common to the cathode of the diode and the input of the power transistor controlling portion, and the cathode of which is connected to the ground.

13. The switching mode power supply of claim 1, further comprising a high pass filter for removing a direct current element from a signal output from the synchronous signal controlling portion, between the input of the power transistor controlling portion to which the synchronous signal is applied and the synchronous signal controlling portion.

14. The switching mode power supply of claim 13, wherein the high pass filter is a capacitor.

* * * * *